Nov. 27, 1956    M. P. WHITNEY    2,771,792
ENGINE COOLING FAN DRIVE GEARING
Filed April 23, 1954
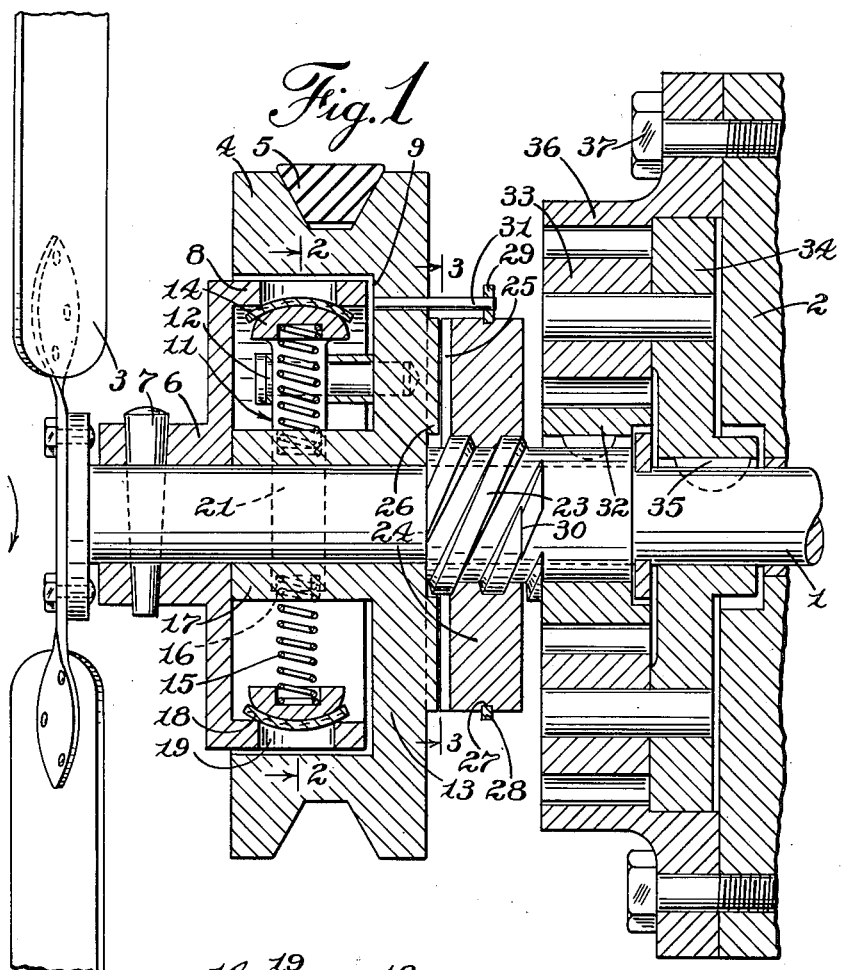
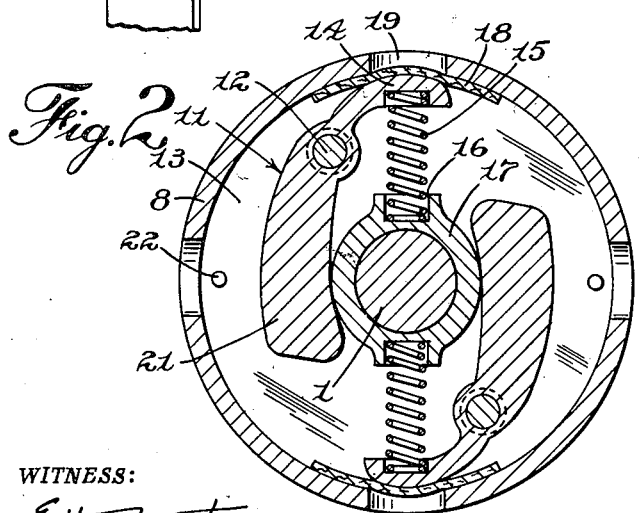
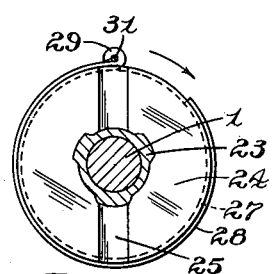
INVENTOR.
Maurice P. Whitney
BY
Clinton L. James
ATTORNEY
WITNESS:
Esther M. Stockton

# United States Patent Office 2,771,792
Patented Nov. 27, 1956

2,771,792

ENGINE COOLING FAN DRIVE GEARING

Maurice P. Whitney, Elmira, N. Y., assignor to Bendix Aviation Corporation, Elmira Heights, N. Y., a corporation of Delaware Application April 23, 1954, Serial No. 425,155

5 Claims. (Cl. 74—752)

The present invention relates to variable speed ratio gearing for engine driven auxiliary devices such as generators, cooling fans, etc. and more particularly to an automatic variable ratio drive which is controlled in accordance with the speed of rotation of the driving member.

The rotary fan used to assist in cooling internal combustion engines for automotive purposes as well as the electrical generator are customarily belt-driven from the engine crank shaft, and consequently rotate at speeds corresponding to engine rotation. If the size, pitch and driving ratio of the fan are such as to secure satisfactory cooling at low speeds with full engine load, it follows that at high speeds of the vehicle when little or no forced convection of air is necessary, the fan uselessly consumes a significant fraction of the power of the engine. Similarly, a generator which is designed to operate efficiently at low speeds is wasteful of power at high speeds.

It is an object of the present invention to provide a novel transmission for rotating auxiliary devices of an internal combustion engine which establishes one ratio of drive during low engine speeds and a second lower ratio during high rotative speeds of the engine.

It is another object to provide such a device in which the shift from one driving ratio to the other is automatically controlled by the speed of the engine and takes place without appreciable shock or drag of the rotated parts.

Further objects and advantages will be apparent from the following description taken in connection with the accompanying drawing in which:

Fig. 1 is a side elevation, partly broken away and in section of a preferred embodiment of the invention shown as a drive for an engine-cooling fan;

Fig. 2 is a section taken substantially on the line 2—2 of Fig. 1; and

Fig. 3 is a section taken substantially on the line 3—3 of Fig. 1, on a reduced scale.

In Fig. 1 of the drawing there is illustrated a fan shaft 1 which is rotatably mounted in the frame 2 of the engine and carries on its outer end a fan 3 which is as usual located in such manner as to draw cool air through the engine radiator and over the engine, not further illustrated. A driving pulley 4 is journalled on the fan shaft 1 and is arranged to receive a belt 5 rotated by a pulley on the engine crank shaft in the usual manner.

A high-speed driven clutch member 6 is fixedly mounted on the fan shaft 1 in any suitable manner as indicated at 7. This clutch member comprises a hollow cylindrical drum portion 8 which is located in an annular recess 9 in the body of the pulley 4. A plurality of high speed driving clutch members 11 (Fig. 2) are pivoted as indicated at 12 on the web 13 of the pulley 4, and are provided at one end with shoe portions 14 which are pressed into frictional engagement with the interior of the driven clutch drum 8 by means of compression springs 15 seated at their outer ends in the shoes 14 and at their inner ends in sockets 16 formed in the hub 17 of the pulley. The shoes 14 are preferably provided with frictional facing material 18 attached thereto in any suitable manner, and the drum 8 is formed with openings 19. The springs 15 are effective to cause the friction material to protrude slightly into the openings 19 and thereby prevent slippage of the clutch when the parts are rotating below a predetermined speed.

Means are provided for overcoming the springs 15 and withdrawing the shoes 14 from contact with the drum 8 when the pulley is rotated above the predetermined speed. As here shown, this means comprises weight elements 21 on the clutch members 11 located oppositely to the shoes 14, whereby centrifugal force causes the shoes to be drawn inwardly. The outward movement of the weight members 21 is limited by suitable abutment means such as the pins 22 located in the web 13 of pulley 4.

In order to provide a low speed drive for the fan 3, a screw shaft 23 is journalled on the fan shaft 1 adjacent to the pulley 4 and has threaded thereon a clutch operating nut 24 having a diametrical groove 25 arranged to receive radial ribs 26 formed on or attached to the web 13 of pulley 4. The nut 24 is formed with a peripheral groove 27, and a split spring drag ring 28 is slidably mounted in said groove and is provided with an out-turned end 29 which engages against a pin 31 fixed in the side of the pulley 4. As best shown in Fig. 3, when the nut 24 rotates in the direction of the arrow faster than the pulley 4, the spring ring 28 tends to unwrap and release the nut allowing it to overrun freely. On the other hand, when the speed of the pulley 4 exceeds that of the clutch nut, the spring ring is actuated by the pin 31 to wrap around and grip the nut, thereby rotating the nut forwardly on the screw shaft 23. The pitch of the threads on the screw shaft is such that when the nut 24 is so rotated thereon by the drag ring 28, the nut will be traversed to the left in Fig. 1 into clutching engagement with the pulley 4.

Travel of the nut 24 away from the pulley 4 while overrunning the latter is preferably limited by suitable means such as shoulders 30 formed on the threads of screw shaft 23.

A sun gear 32 is fixedly mounted on the screw shaft 23, and a plurality of planet gears 33 are mounted on a planet carrier 34 which is fixedly mounted on the fan shaft 1 as indicated at 35. The planets 33 mesh with the sun gear 32 and also with a stationary orbit gear 36 which is fixed as indicated at 37 to the engine frame 2.

In operation, rotation of the pulley 4 in the direction of the arrow by the engine driven belt 5 will normally rotate the fan shaft 1 at the same speed as the pulley by reason of the engagement of the high-speed clutch members 11, carried by the pulley, with the interior of the drum 8 of the driven clutch member 6. At this time the screw shaft 23 will be rotated through the planetary gearing from the fan shaft 1 at a speed higher than the speed of rotation of the pulley, and the light retarding effect of the drag spring 28 on the clutch operating nut 24 causes the nut to be held out of engagement with the pulley by the traversing action of its threaded connection.

When the engine is accelerated sufficiently to cause the pulley 4 to rotate above the predetermined speed, centrifugal force acting on the weight elements 21 of the high-speed clutch members 11 causes the shoes 14 to be drawn inwardly away from the drum 8, thus breaking the high-speed driving connection from the pulley to the fan shaft.

The screw shaft 23 consequently decelerates, and as soon as the rotation of the pulley 4 exceeds that of the screw shaft, the low-speed clutch operating nut 24, being rotated by the drag spring 28 at the speed of the pulley, is traversed by its threaded connection with the screw shaft into clutching engagement with the pulley, and thenceforth the fan shaft 1 is driven at a reduced speed from the pulley 4 through the planetary reduction gearing 32, 33, 34, 36.

In view of the fact that the weight members 21 have freedom for a substantial amount of radial movement, it will be obvious that their centrifugal force will be increased correspondingly as they move outward, so that release of the high-speed clutch will take place quickly and positively, and conversely reengagement of such clutch will take place at a considerably lower speed and also occur in a positive manner with very little slip or drag.

Although but one embodiment of the invention has been shown and described in detail, it will be understood that various changes may be made in the design and arrangement of the parts without departing from the spirit of the invention.

I claim:

1. In a variable speed drive for engine-driven auxiliary devices, a rotatable driven shaft, a driving pulley journalled thereon having a clutch face formed on one side thereof, a high speed driven clutch member fixed on said shaft adjacent the pulley, a driving clutch member mounted on the pulley, yielding means urging the clutch members into engagement, centrifugal means for separating the clutch members; a screw shaft journalled on the driven shaft adjacent the pulley, a low speed clutch operating nut threaded on the screw shaft for clutching engagement with said clutch face of the pulley to thus be driven thereby, a sun gear fixed on the screw shaft, a planet gear meshing therewith, a carrier for said planet gear fixed on the driven shaft, and a fixed orbit gear surrounding and meshing with the planet gear.

2. A variable-speed drive as set forth in claim 1 in which the high-speed driven clutch member is in the form of a hollow drum, and the high speed driving clutch member comprises a friction shoe at one end and a weight element at the other, and is pivotally mounted on the driving pulley for movement of said shoe into and out of engagement with said drum, said yielding means for engaging the high speed clutch is in the form of a compression spring seated at one end in the hub of the pulley, and at the other end in the shoe portion of the driving clutch member, said shoe portion of the driving clutch member has a flexible friction facing material fixed thereon, and the driven clutch drum has an opening into which the facing material protrudes under the pressure of the clutch spring at low rotative speeds to thereby prevent relative slippage.

3. A variable-speed drive as set forth in claim 1 including further a frictional slip coupling between the driving pulley and the low-speed clutch operating nut.

4. A variable-speed drive as set forth in claim 1 in which the low-speed clutch operating nut has a peripheral groove formed therein, and including further a split spring ring slidably mounted in the groove having an out-turned end, and a pin projecting from the driving pulley in position to engage said end of the spring ring.

5. A variable-speed drive as set forth in claim 4 in which the connection of the spring ring to the pulley is at the forward end of the ring as respects the direction of its rotary movement whereby when rotation of the pulley is transmitted to the ring by means of the pin, said pin draws the spring after it in its rotary movement, placing tension on the spring, and consequently causing the spring to wrap down and grip the clutch operating nut.

References Cited in the file of this patent

UNITED STATES PATENTS

| | | |
|---|---|---|
| 1,782,513 | Ross | Nov. 25, 1930 |
| 1,832,726 | Newcomb | Nov. 17, 1931 |
| 2,187,181 | Shackelford | Jan. 16, 1940 |
| 2,266,164 | Claytor | Dec. 16, 1941 |
| 2,375,785 | Goode et al. | May 15, 1945 |